June 25, 1940.  C. D. PETERSON  2,205,629
AIR COOLED CLUTCH CONSTRUCTION
Filed Oct. 2, 1937  3 Sheets-Sheet 1
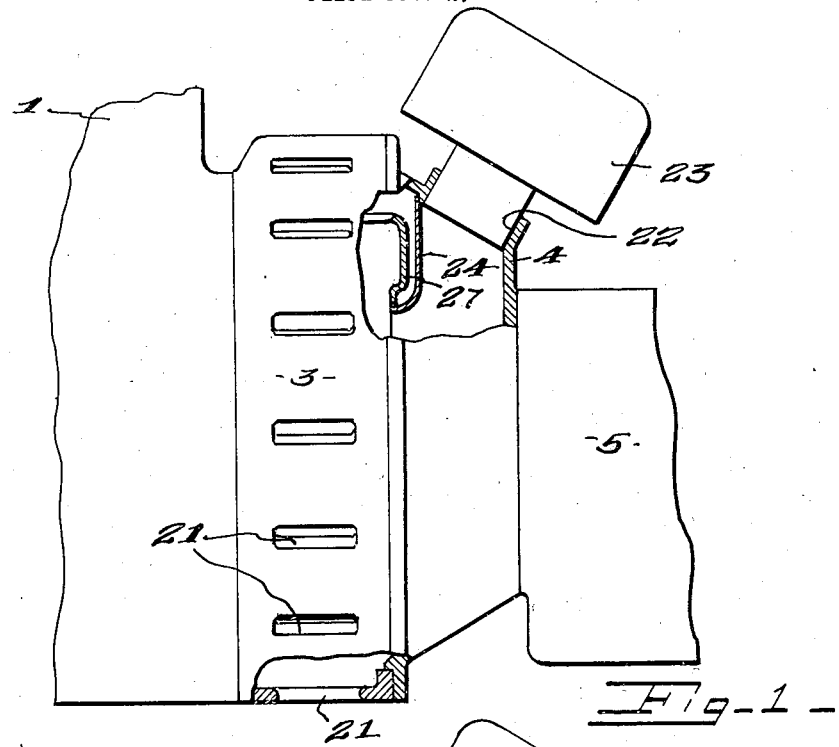
Fig-1-
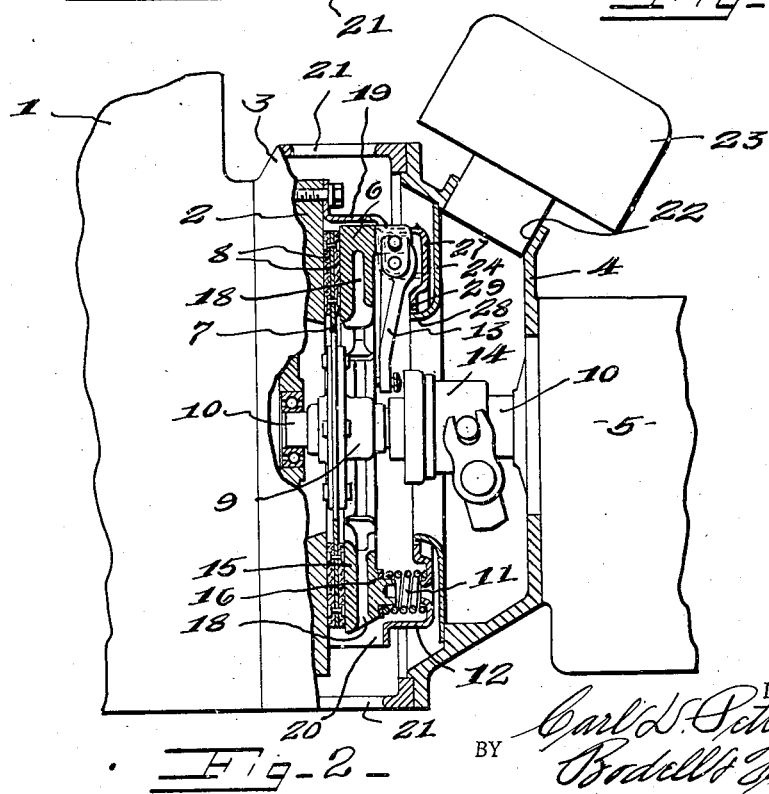
Fig-2-
INVENTOR.
Carl D. Peterson
BY Bodell & Thompson
ATTORNEYS.

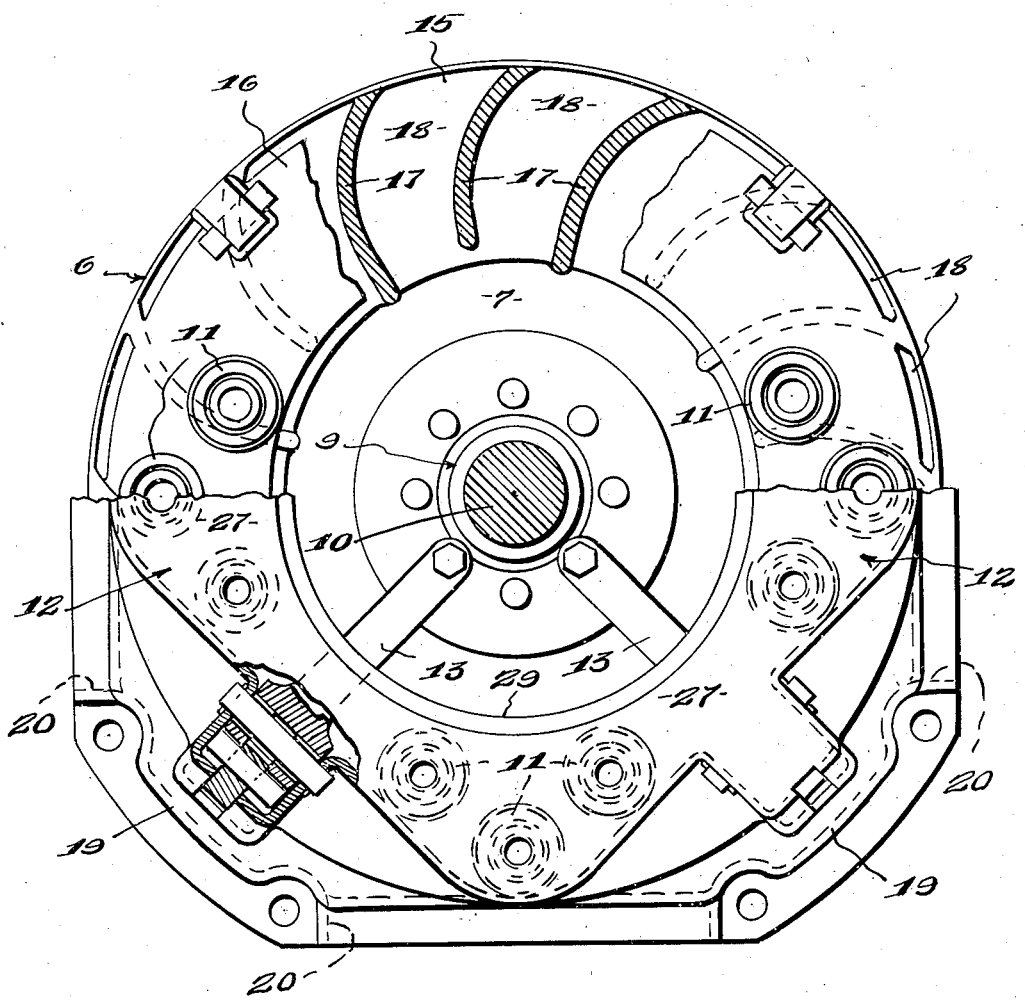
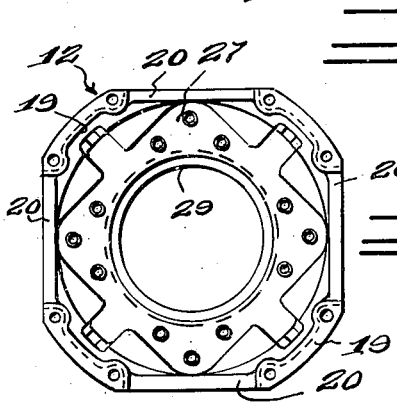

June 25, 1940.  C. D. PETERSON  2,205,629
AIR COOLED CLUTCH CONSTRUCTION
Filed Oct. 2, 1937  3 Sheets-Sheet 3
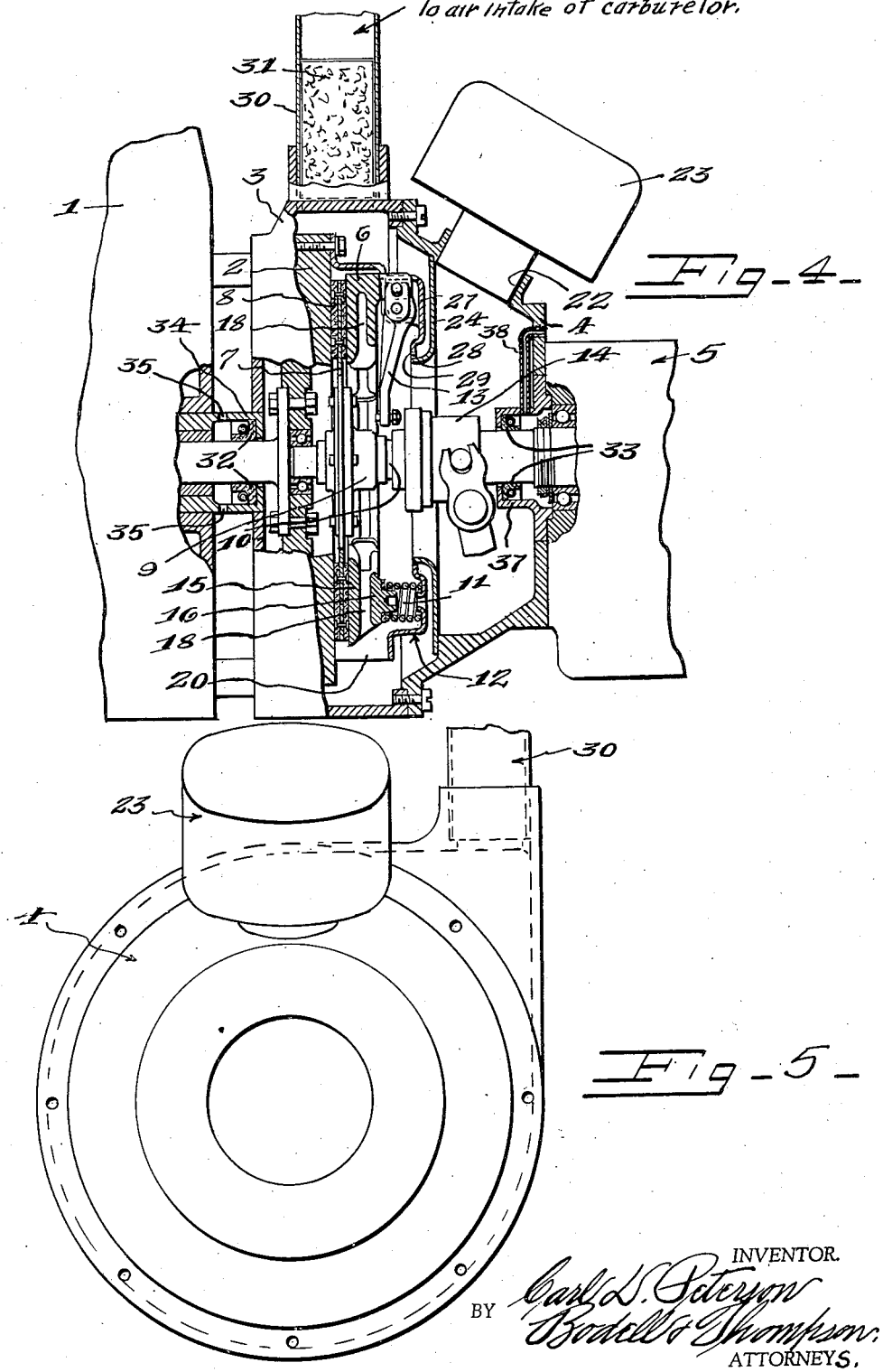

Patented June 25, 1940

2,205,629

UNITED STATES PATENT OFFICE 2,205,629

AIR COOLED CLUTCH CONSTRUCTION

Carl D. Peterson, Toledo, Ohio

Application October 2, 1937, Serial No. 167,007

3 Claims. (Cl. 192—113)

This invention relates to friction clutches, particularly clutches for motor vehicles, and has for its object a friction clutch, which is cooled by a positive current of air passing therethrough.

It further has for its object, means for creating the positive air current and for directing the air from an air inlet to the central part of the clutch, and thence outward through a part or parts of the clutch.

It further has for its object a construction by which the positive air current is created by the suction in the carburetor of the engine.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a fragmentary side elevation, partly broken away, and parts being omitted, of a clutch embodying this invention, the clutch housing and contiguous portions of the engine, and the gear box being also shown.

Figure 2 is a view similar to Figure 1 showing the clutch itself in section.

Figure 3 is an enlarged fragmentary elevation, partly in section, showing the pressure ring and the air passages therethrough or the centrifugal fan formation thereof, the back plate of the clutch enclosing the pressure ring, and the air outlets therethrough into the clutch housing.

Figure 4 is a view similar to Figure 2 of a slightly different embodiment of the invention, wherein the clutch housing is provided with a single outlet for connection to the air intake of the carburetor of the engine.

Figure 5 is an elevation, looking to the left of Figure 4, with the gear box omitted.

Figure 6 is an elevation of the back plate, looking rearwardly or to the right in Figure 2, showing particularly the air outlet arrangement into the clutch housing.

1 designates the engine of a motor vehicle; 2 the fly wheel thereof which is the driving element of the friction clutch, which transmits the power from the crankshaft of the engine. 3 designates the fly wheel housing; 4 the bell housing at the front end of the gear box 5. For brevity's sake, the fly wheel housing and the bell housing are referred to in the claims as the clutch housing.

6 designates the pressure ring which is carried by the fly wheel or driving element of the clutch and rotates therewith. 7 designates the driven element or disk or plate having friction facings 8 on opposite sides of its margin for coacting with the fly wheel and the pressure ring. The clutch plate or disk 7 has the usual hub 9 slidably splined on or otherwise secured to the clutch shaft 10 in the usual manner.

11 designates the clutch springs for pressing on the pressure plate to press the same toward the fly wheel to hold the clutch engaged, there being a plurality of these springs, which are interposed between the pressure ring 6 and the back plate, designated generally 12. This back plate, because of the cooling system, embodies novel features, hereinafter pointed out.

13 designates the motion transmitting and multiplying levers suitably carried by the back plate and coacting with the pressure ring 6 at their outer ends and with a throw-out collar 14 at their inner ends. When the throw-out collar is operated by the depression of the clutch pedal of the vehicle in the usual manner, the pressure plate 6 is retracted against the pressure of the springs 11 and causes the clutch to disengage. Suitable pull-off springs, not shown, may be used.

In the form shown in Figures 1 and 2, the positive air draft for cooling the clutch is created by the blower action of the pressure ring, which is of centrifugal fan construction. The pressure ring is shown as an integral structure formed with spaced apart front and rear portions 15, 16 and with tie-bars 17 between them, which provide radially extending air passages 18. The tie-bars are curved or arcuate, and in effect, form vanes for facilitating the outward throwing of the air under the centrifugal force. The tie-bars 17 also stiffen the plate against distortion from heat and increase the area of the cooling surface of the plate, so that the heat, generated in any manner and absorbed by the pressure ring, is carried off by the air current.

The back plate, as here illustrated, includes an annular portion 19 adjacent the fly wheel 2 and around the pressure ring, this being shown as provided with outlets 20 around the same for permitting air thrown by the pressure plate and other rotating parts of the clutch, to pass into the clutch housing or the portion 3 thereof enclosing the fly wheel, and this portion 3 is provided in the form shown in Figures 1 and 2, with a series of peripheral outlets 21. 22 designates the air inlet having a suitable air cleaner 23 therein, this being located in the rear portion of the clutch housing, that is, in the bell housing in the rear of the clutch. A deflector or baffle plate 24 is provided within the rear portion of the clutch housing for directing the incoming air into the interior of the clutch centrally thereof, into the central inlet of the centrifugal fan formation of the pressure ring, where it will readily pass out through the passages 18 of the pressure ring.

The back plate 12 is also provided with a rear portion 27 extending in the rear of the upper ends of the levers 13, and the deflector is provided with an inturned flange 28 extending close to the inner edge 29 of the rear portion 27 of the back plate, the flange being in the form of a venturi.

When the engine is in operation, the rotation of the disk 6 creates an air current, which draws the air in through the inlet 22 or the air cleaner 23 through the Venturi opening at 28 in the pressure ring, thence radially outward through the passages 18 of the pressure ring, through the outlets 20 into the clutch housing, and out through the outlets 21 to the outer air. This air current cools the pressure ring and other parts of the clutch.

In Figures 4 and 5, the air current is created by the pressure ring but also by the suction created through the carburetor of the engine, and instead of the outlets 21 to the outer air, the clutch housing, or the portion 3 constituting the fly wheel housing, is provided with a tangential outlet 30 for connection to the main air intake of the carburetor, this having a suitable filter 31 therein to catch any particles of material that might wear off the clutch, and prevent them from passing into the carburetor.

As seen in Figure 4, seals 32, 33 are provided in order to prevent the suction from drawing oil out of the engine casing 1 through the rear crank shaft bearing and out of the gear box through the bearing for the clutch shaft. The seal 32 is located in a cup-shaped extension 34 projecting beyond the rear face of the engine or crank casing 1 and having vents 35 to the outer air. In this construction, the fly wheel housing 3 is spaced from the rear end of the engine or crank casing 1 and secured thereto in any suitable manner, the spacing providing communication between the inside of the cup 34 and the outer air through the vents 35 to break any vacuum which may be created in the cup-shaped member 34 by the suction within the clutch housing.

The seal 33 is provided in the bearing cap 37 in the front wall of the gear box 5 and this bearing cap 37 is vented to the outer air through a duct 38 to break the vacuum within the cap 37 which may be created by the suction within the clutch housing, tending to draw oil from the gear box 5 out through the cap 37.

In either form of my invention, a positive air current is passed through the clutch with ample air inlet and outlet to provide for maximum volume and velocity. Owing to the construction of the pressure ring, it acts most efficiently as a centrifugal fan or blower rotor at the same time that it is acting as a heat absorber and conductor.

What I claim is:

1. In a friction clutch of the type including a driven element extending between a driving element and a pressure ring rotatable with the driving element, and means operable to apply pressure to the pressure ring and to relieve the same of the pressure to release the clutch, the pressure ring being in the form of a centrifugal fan having a central inlet on the rear side thereof, and a clutch housing having an air inlet in the rear of the pressure ring and at one side of the axis of the clutch, and a peripheral outlet located outward radially relative to the pressure ring, and a deflector in the rear of the pressure plate between the plate and the inlet and providing a compartment with which the air inlet communicates, the deflector having a passage located centrally of the clutch.

2. In a friction clutch of the type including a driven element extending between a driving element and a pressure ring rotatable with the driving element, and means operable to apply pressure to the pressure ring and to relieve the same of the pressure to release the clutch, the pressure ring being a centrifugal fan having an axial inlet in its rear side, a back plate rotatable with the pressure ring and having peripheral outlets and a passage alined with the inlet of the fan formation of the pressure ring, a closed housing around the clutch having an air inlet in the rear of the pressure ring and the back plate, and a peripheral air outlet located outward radially relative to the back plate, and a deflector carried by the housing in the rear of the back plate providing a compartment with which the air inlet of the housing communicates, the deflector having a passage alined with that of the back plate.

3. In a friction clutch including frictionally engaged rotating parts having relative axial shifting movement to engage and disengage the clutch, the combination of one of said rotating parts being of centrifugal fan formation having a central inlet on its outer or rear side and a closed clutch housing having an air inlet in the rear of the rotating parts and a peripheral outlet located radially outward from the rotating parts, a suction pipe connected to the outlet, and means for deflecting the air from the inlet to the central portion of the centrifugal fan formation.

CARL D. PETERSON.